Patented Sept. 3, 1940

2,213,263

UNITED STATES PATENT OFFICE 2,213,263

PROCESS OF COATING METALS

John S. Thompson and Herbert K. Ward, Detroit, Mich., assignors to The Patents Corporation, Wayne County, Mich.

No Drawing. Application January 10, 1936, Serial No. 58,561. Renewed October 7, 1939

5 Claims. (Cl. 148—6)

This invention relates to the field of the processing of metals, especially aluminum, to obtain on the surfaces thereof chemical coatings which are an integral part of the metal in contrast to applied coatings which are simply deposits on the metallic surfaces.

An object of the invention is to obtain bonding coats on aluminum surfaces to which can be applied the usual finish coats of paints, lacquers, enamels, etc. A further object is to obtain corrosion resistant coats on aluminum surfaces. Other objects will appear hereinafter. Included in the invention are alloys containing aluminum as the predominant metal.

In the past, aluminum has been treated with various acids and salts usually with a view to etching the surfaces of the aluminum to obtain varied designs. In United States Patent 1,710,-743 a solution containing a soluble fluorine compound and a soluble metallic salt is described for use to produce a colored coating on aluminum surfaces. The fluorine compound has a dissolving action on the aluminum surfaces and the other metal is deposited. This patent also discloses the obtaining of colored effects on the surfaces of aluminum alloys by use of a solution of sodium silicofluoride to dissolve out the aluminum constituent, thus exposing the other metals of the alloy. The patentee further states that a pure solution of sodium silicofluoride has neither coating nor coloring function on pure aluminum.

In United States Patent 1,723,067 a solution containing fluosilicates and molybdates among others is suggested for coating aluminum. United States Patent 1,022,274 describes etching fluids for flat printing plates of metal containing at least two fluosilicates, a salt of aluminum and other ingredients. United States Patent 1,638,-273 describes treatment of aluminum with a solution containing a soluble fluosilicate, a salt of a non-ferrous iron group metal, and/or alkali salt to produce a mottled, speckled or spotted appearance on the aluminum surface. United States Patent 597,366 describes mixtures containing hydrofluosilicic acid for its corrosive or etching action on aluminum in the production of lithographic plates and for this purpose uses acid mixtures of high concentrations as high as 20% and over. In United States Patent No. 1,957,354 solutions are used containing various neutral soluble salts, the anions of which comprise the fluorine element in dilute concentrations for treating light metals.

We have discovered that a salt of hydrofluosilicic acid in solution will combine chemically with aluminum to form on the surface thereof an aluminum salt which is corrosion-resistant and forms a bonding coat for a siccative coat of paint, enamel, lacquer, vitreous enamel, etc. This discovery is all the more notable because of the statement in United States Patent 1,710,743 that sodium silicofluoride will etch aluminum but will not coat it. We have found that solutions of sodium silicofluoride of a concentration of one-half percent and upward to saturation do react with aluminum surfaces to give chemical coatings of the type described.

We have also discovered that a dilute solution of $H_2SiF_6$ will produce an adherent coating on aluminum when the solution is not so concentrated that it etches the metal severely.

We have further discovered that a solution containing hydrofluosilicic acid and a salt thereof gives highly superior results when used as a processing solution for aluminum to obtain chemical coatings of the type described. Metal accelerators may be used in some cases to improve the efficiency of the solutions.

Soluble salts of hydrofluosilicic acid and mixtures may be employed in this invention, especially the fluosilicates of sodium, magnesium and manganese. As stated above, highly superior results are obtained if hydrofluosilicic acid is also employed with the individual salts or mixtures.

The following examples are given to illustrate the invention and are to be considered as merely illustrative and not limitative:

*Example 1.*—Aluminum panels are immersed in a solution of the following composition at boiling or near boiling temperature:

$Na_2SiF_6$ ---------------------------------gr--  2
30% $H_2SiF_6$ -----------------------------cc--  .5
Water ------------------------------------cc-- 100

After 1 to 5 minutes an adherent coating is obtained on the surface of the panel.

Control of this solution and other solutions used in this invention is carried out through the medium of pH values, the range of which is 1.5 to 4.0

As the solution is used, replenishment of ingredients will have to be made but if done so in such a manner as to keep the pH within the limits mentioned above, a solution may be used continuously and indefinitely.

This solution and the other solutions of the invention may be applied to the metal surface by any methods known to the art including dipping and spraying processes. The preferred operating temperature is from 80° C. to boiling—boiling or near boiling being especially efficient.

*Example 2.*—Under conditions similar to those described in Example 1 a 2% solution of sodium silicofluoride used at boiling for 5 minutes gave a thin, gray, adherent coating. Some acceleration was obtained when .1% of magnesium silicofluoride is used in the solution.

*Example 3.*—Under conditions similar to those of Example 1 a solution was used containing 2% sodium silicofluoride plus .1% molybdic acid at boiling for 5 minutes and a heavy, dark, adherent coating was obtained on the aluminum panels. Using .1% sodium tungstate in place of molybdic acid and boiling for 5 minutes, some acceleration was obtained.

*Example 4.*—Under conditions described in Example 1 successive solutions were used containing .4 cc. of 30% $H_2SiF_6$ per 100 cc. of water at boiling and one of the following:

.2% $MgSiF_6.6H_2O$          .2% $CdSO_4$
.05% molybdic acid           .4% $HgCl_2$
.1% sodium tungstate         .2% $Pb(NO_3)_2$
.2% $FeSiF_6.6H_2O$          .02% $AgNO_3$
.05% $CoSO_4$                .02% $CuSO_4$
.05% $NiSO_4.6H_2O$          .25% $KSbOC_4H_4O_6$
.2% $MnSiF_6.6H_2O$          .05% $SnCl_2.5H_2O$
.2% $ZnSiF_6$ Under similar conditions the following solutions were used, each of which contained .5 cc. of 30% $H_2SiF_6$ per 100 cc. of water and one of the following ingredients. The solutions were used at room temperature with a processing time of 15 minutes.

½% $MgSiF_6$                 .5% $CdSO_4$
.05% molybdic acid           .4% $HgCl_2$
.1% sodium tungstate         .5% $Pb(NO_3)_2$
½% $FeSiF_6$                 .02% $AgNO_3$
.1% $NiSO_4.6H_2O$           .02% Cu (as $CuSO_4$)
.1% $CoSO_4$                 .25% $KSbOC_4H_4O_6$
½% $MnSiF_6.6H_2O$
.5% $ZnSiF_6$                .5% $SnCl_2.2H_2O$

*Example 5.*—Under conditions similar to Example 1 with the exception that a processing time of 15 minutes at room temperature was used, the following solutions were employed containing 100 cc. water, .5 cc. 30% $H_2SiF_6$, 1 gram $Na_2SiF_6$ and one of the following:

½% $MgSiF_6$
.05% molybdic acid           ½% $CdSO_4$
.1% sodium tungstate         .1% $HgCl_2$
½% $FeSiF_6$                 .5% $Pb(NO_3)_2$
.1% $CoSO_4$                 .01% $AgNO_3$
.1% $NiSO_4.6H_2O$           .01% Cu (as $CuSO_4$)
½% $MnSiF_6.6H_2O$           .1% $KSbOC_4H_4O_6$
½% $ZnSiF_6$                 .25% $SnCl_2.2H_2O$ To solutions of the same composition as above was added 1 gram of sodium silicofluoride and the solutions were heated to a boil. At this temperature it was necessary only to use a processing time of 2 minutes to obtain chemical coatings on the aluminum surfaces.

*Example 6.*—Under conditions similar to Example 1 except that a processing time of 2 minutes at boiling was used, the following solutions were employed:

Water _____ cc__ 100
$Na_2SiF_6$ _____ gram  1
30% $H_2SiF_6$ _____ cc__ .5 plus one of the following: .1% $Pb(NO_3)_2$, .1% $CdSO_4$, .1% $SnCl_2.2H_2O$.

*Example 7.*—In this example various strengths of $Na_2SiF_6$ solutions were employed at various temperatures for various processing periods on commercially pure aluminum panels. In each case the solution contained 100 cc. water, together with the percentage of sodium silicofluoride specified in each case.

.1% $Na_2SiF_6$ solution gave a thin coating at boiling or at 80° C. in 5 to 45 minutes. Solutions of $Na_2SiF_6$ from one-half percent up to saturation in distilled water gave a good coating, gray and adherent, in 5 to 10 minutes at boiling. At 70 or 80° C. in 5 to 10 minutes a good gray, adherent coating was obtained. At 60° C. in 10 to 15 minutes a somewhat thinner, gray, adherent coating was obtained and at 45° C., thinner coatings. In these tests the times were varied according to the concentrations and at 70° or above the coating action is faster and gives a heavier coating. At room temperature the one-half percent solution or a saturated one (less than 1%) gives a whitish coating.

While, as indicated above, coatings can be obtained on aluminum with the solutions of this invention at room temperature, temperatures of 45° C. and above are preferred. Sodium silicofluoride solutions in the range of one-half percent up to saturation give gray, adherent coatings, on commercially pure aluminum. Temperatures of 70 or 80° C. and above should be employed to obtain faster coating action and heavier coatings. A 2½% solution of $Na_2SiF_6$ in distilled water, in other words a pure solution, gives a good, adherent, gray coating on an aluminum panel, which is 99.99% aluminum, (the purest aluminum obtainable) in 5 minutes at boiling. There is no danger of overprocessing aluminum in a solution of sodium silicofluoride at any of the temperatures indicated.

*Example 8.*—Panels were processed under conditions similar to those given in Example 1 with a saturated solution of potassium silicofluoride for 5 minutes at boiling to obtain a good gray coating on the aluminum.

*Example 9.*—Aluminum metal is immersed in a solution containing 0.5 cc. 30% $H_2SiF_6$ per 100 cc. water at boiling temperature. A hard, gray, adherent coating is obtained in 5 minutes. When used at 75° C. this solution will produce a like coating but the processing time is increased.

The addition of a soluble silicofluoride which acts as a buffering agent makes the solution much more stable. A soluble fluoride such as NaF has also been found to be effective as a buffering agent.

For best results the pH of these solutions should be kept between 1.5 and 4.0.

We have further discovered that various rinses applied to the aluminum surfaces after treatment in accordance with the above described processes confer highly superior properties on the coatings as indicated by increased resistance when the coated surfaces are subjected to salt spray and soak tests. Application of the rinse may follow immediately after treatment in the coating solution or may be preceded by a water rinse. Following the last rinse the pieces being processed may be air dried or dried in an oven at elevated temperatures at which time the work is ready for the finish coats. Particularly good results have been obtained by rinsing in solutions of chromic acid made up by adding from 1 to 8 grams of $CrO_3$, preferably about 4 grams per gallon of water. The chromic rinse is preferably hot, at temperatures of about 150° F. and for best results the articles are immersed for a quarter to half a minute.

Other rinses have been found to confer the same desirable properties on the coatings obtained according to this invention, including a phosphoric acid rinse. The phosphoric acid rinse may contain varying amounts of phosphoric acid but a solution containing 4 cc. $H_3PO_4$ per gallon of water has been found very satisfactory. Similar results have been obtained from the use of other rinses such as oxalic acid in the preferred amount of 4 grams per gallon of water.

All of the rinses described may be used at from room to boiling temperature and may be applied by any method known to the art, such as spraying, dipping, etc. We have found that these rinses are beneficial for any coatings containing aluminum fluoride regardless of what process is used to obtain the aluminum fluoride coating on the aluminum.

We have found that aluminum alloys may also be treated by the processes described. By "aluminum alloy" we mean an alloy in which aluminum is the predominant metal. Among the alloys which have been processed are alloys containing manganese and/or copper and/or magnesium. In some cases the pH in solutions used for processing various alloys differs somewhat from the ranges heretofore given. An alloy containing manganese in the amount of about 1¼% can be processed in the range 1.5 to 4.0 pH. For an alloy containing copper, manganese and magnesium in about the percentages 4%, ½% and ½%, the pH range of 1 to 2 gives best results with an optimum of about 1.2 to 1.5. An alloy containing about 4.2% copper, ½% magnesium and 1.5% manganese falls in about the same pH range. Generally speaking, the pH range for aluminum alloys is from 1 to 4 while for commercial and pure aluminum it is as heretofore stated.

What we claim is:

1. A process which comprises treating a surface of one of the group consisting of aluminum and aluminum alloys with a solution containing $H_2SiF_6$ and a soluble salt thereof as the major portion of its ingredients until a visible protective paint-holding coating is obtained upon the metallic surface.

2. A process which comprises treating a surface of one of the group consisting of aluminum and aluminum alloys with a solution containing $H_2SiF_6$ and $Na_2SiF_6$ as the major portion of its ingredients until a visible protective paint-holding coating is obtained upon the metallic surface.

3. A process as described in claim 2 in which the solution contains a soluble salt of an accelerating metal below aluminum in the electromotive series.

4. A process which comprises treating a surface of one of the group consisting of aluminum and aluminum alloys with solutions containing one of the group consisting of $H_2SiF_6$, soluble salts of $H_2SiF_6$ and mixtures of $H_2SiF_6$ with a soluble salt thereof until a visible protective paint-holding coating is obtained upon the metallic surface and thereafter subjecting said coated surface to the action of a solution containing as the major portion of its ingredients one of the group consisting of chromic acid, phosphoric acid and oxalic acid and mixtures thereof.

5. A process which comprises treating a surface of one of the group consisting of aluminum and aluminum alloys with solutions containing one of the group consisting of $H_2SiF_6$, soluble salts of $H_2SiF_6$ and mixtures of $H_2SiF_6$ with a soluble salt thereof until a visible protective paint-holding coating is obtained upon the metallic surface and thereafter subjecting said coated surface to the action of a solution containing chromic acid as the major portion of its ingredients.

JOHN S. THOMPSON.
HERBERT K. WARD.